United States Patent [19]

Keathley

[11] 3,889,703

[45] June 17, 1975

[54] SLEEVE VALVE ARRANGEMENT

[75] Inventor: Donald P. Keathley, Middletown, Conn.

[73] Assignee: ICI United States Inc., Wilmington, Del.

[22] Filed: Mar. 5, 1973

[21] Appl. No.: 337,943

Related U.S. Application Data

[63] Continuation-in-part of Ser. No. 229,473, Feb. 25, 1973, abandoned.

[52] U.S. Cl. ................ 137/67; 137/68; 251/63.4; 251/225; 280/150 AB
[51] Int. Cl. ......................................... B60r 21/08
[58] Field of Search ............... 137/67, 68; 220/3; 280/150 AB; 200/47; 251/225

[56] References Cited
UNITED STATES PATENTS

| | | |
|---|---|---|
| 3,111,133 | 11/1963 | Fulton et al. ............... 220/47 X |
| 3,494,370 | 2/1970 | Wahl et al. ............... 137/68 |
| 3,774,807 | 11/1973 | Keathley et al. ............... 222/3 |
| R28,164 | 9/1974 | Stephenson ............... 280/150 AB X |

*Primary Examiner*—Martin P. Schwadron
*Assistant Examiner*—Richard Gerard

[57] ABSTRACT

An explosively operated, hermetically sealed sleeve valve arrangement including a separable piston to move its sleeve and means for locking the sleeve in the open position such that the valve will not close by action of fluid passing through it. The sleeve is hermetically sealed by frangible sealing rings which encompass the fluid openings. The arrangement further comprises safety features which when used with containerized high pressure fluid prevent rocketing and prefunctioning.

8 Claims, 19 Drawing Figures

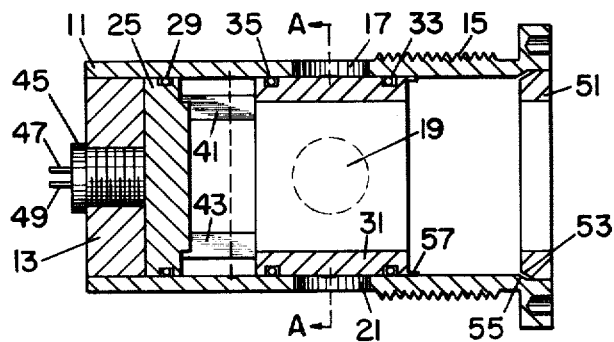
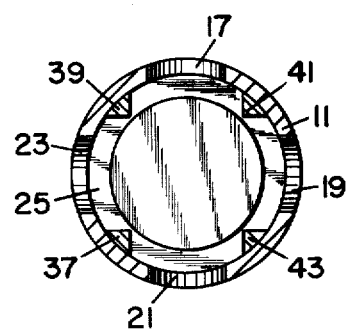
FIG. 1  FIG. 2
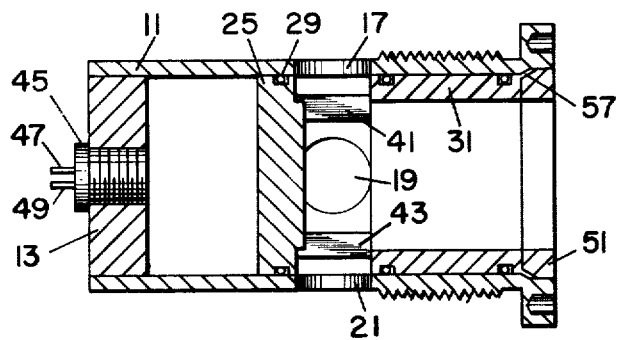
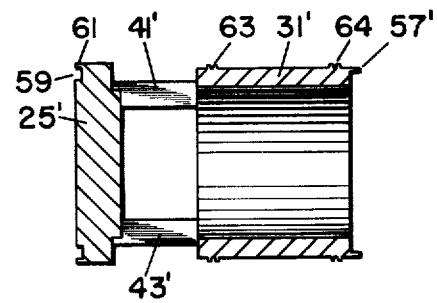
FIG. 3  FIG. 4
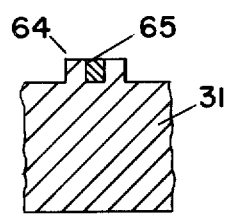
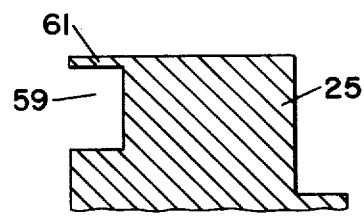
FIG. 5  FIG. 6

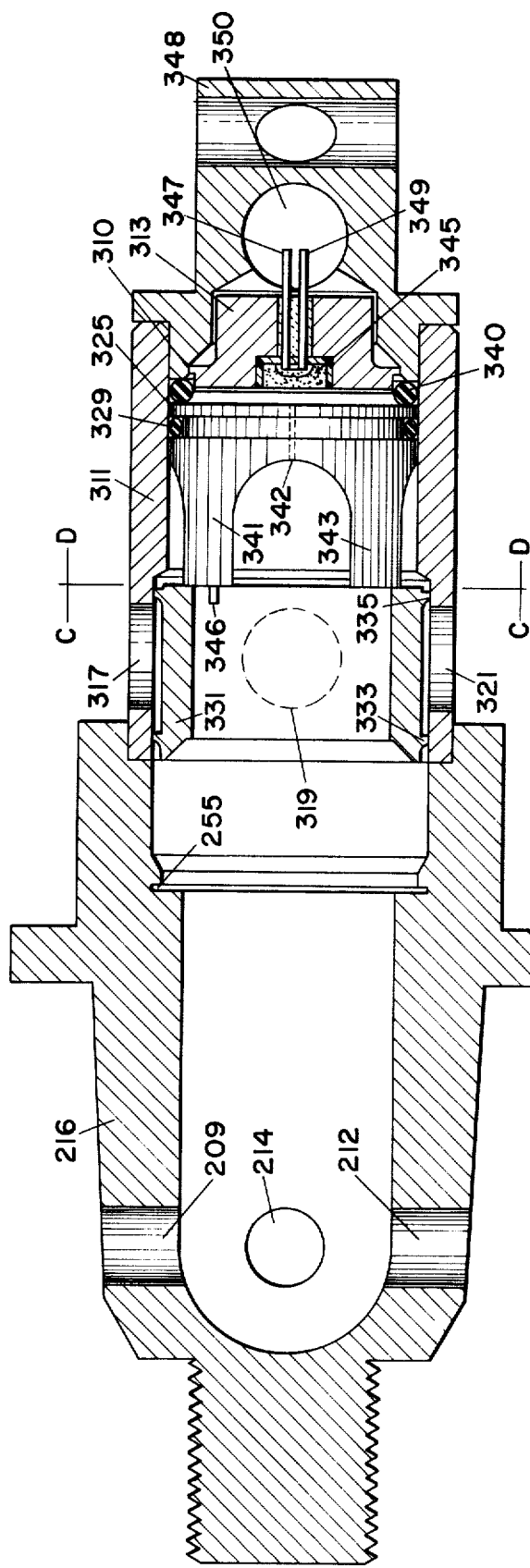
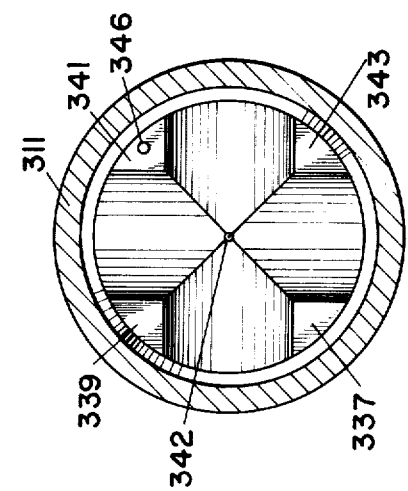
FIG. 14
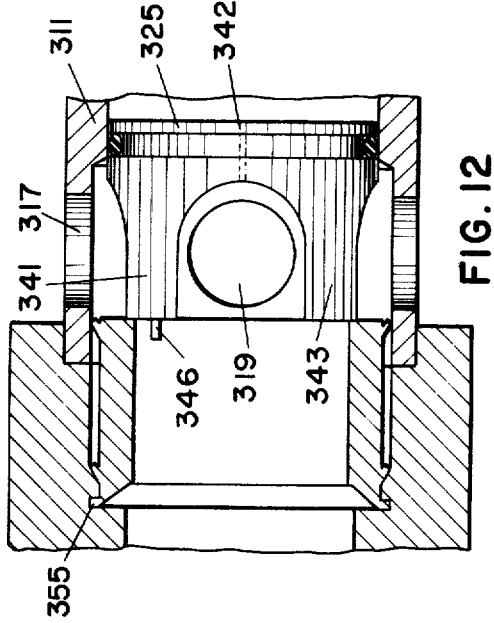
FIG. 12
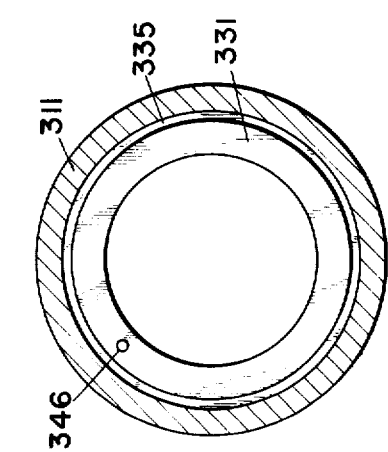
FIG. 13
FIG. 11

3,889,703

1

SLEEVE VALVE ARRANGEMENT

This application is a continuation-in-part of Application Ser. No. 229,473, filed Feb. 25, 1972, and now abandoned.

The present invention relates to a sleeve valve arrangement and preferably to one which is functioned by explosive force or pressurized gas means.

Sleeve valves frequently are employed to release fluids from high pressure containers. There is considerable interest at the present time in valves which can be quickly opened to release compressed gas for the purpose of filling air bags for use as passive restraint apparatus in passenger carrying vehicles. The present invention provides such a valve arrangement which is quick and positive in action and which is not subject to undesired closure after opening. The arrangement also includes thrust neutralizers to prevent rocketing and novel fail-safe squib arrangements to prevent container shattering.

According to the invention, a normally closed sleeve valve is provided in which a shell closed at one end is provided with a port which may be uncovered by an internal sleeve sliding within the shell. The sleeve is driven by a separable piston actuated by pressure exerted between the closure and piston. Preferably the source of the pressure is an explosive squib or a pyrotechnic gas generating device. In one modification of the invention, the end of the sleeve includes a thin skirt which strikes an anvil at the end of the sleeve stroke so that it spreads the skirt and locks the sleeve in the open position. In another modification, a swaging anvil is provided to mushroom the sleeve end to lock the sleeve in the open position.

The trailing end of the piston may be provided with a similar skirt in sliding contact with the shell so as to aid in sealing propellant gases behind the piston.

In another embodiment of the invention, the valve port in the shell or body portion is provided with a frangible element extending into the sleeve to serve as a positive means for holding the sleeve in position until activation of the piston. In a further embodiment of the invention, the sleeve is held in place by deformable retainer elements which, after activation of the sleeve and deformation, hold the sleeve in activated position.

In another embodiment, the closure end piece is equipped with a fail-safe squib arrangement to provide relief in cases where the valve is sealed within the pressurized fluid container. In such arrangements, internal pyrotechnic heaters are actuated at the squib firing to reheat the evolving pressurized gases which cool upon expansion. In such an assembly, the squib is arranged such that by-passing occurs to rupture a disc and provides for an additional safety feature which permits the valve to function to the open position in cases where the internal heaters fire and the squib fails. Without such a safety device, the pressurized container could burst.

Other novel features of the arrangement will be further defined in detail and more particularly described in connection with the drawings which show the preferred embodiments and in which FIG. 1 is a longitudinal section of a valve in original closed position.

FIG. 2 is a cross-sectional view of the valve of FIG. 1 taken through lines A—A in FIG. 1.

2

FIG. 3 is a longitudinal sectional view of the valve of FIG. 1 in activated and opened position.

FIG. 4 is a longitudinal sectional view of a modified sleeve and piston arrangement for use in place of that shown in FIGS. 1, 2, and 3.

FIG. 5 is an enlarged view of a portion of FIG. 4.

FIG. 6 is an enlarged view of another portion of FIG. 4.

FIG. 11 is a longitudinal sectional view of another assembly arrangement in the closed position.

FIG. 12 is a partial sectional view of FIG. 11 showing the valve in the opened position.

FIG. 13 is a cross-sectional view of FIG. 11 taken through section C—C.

FIG. 14 is a cross-sectional view of FIG. 11 taken along section D—D.

Figure 7:
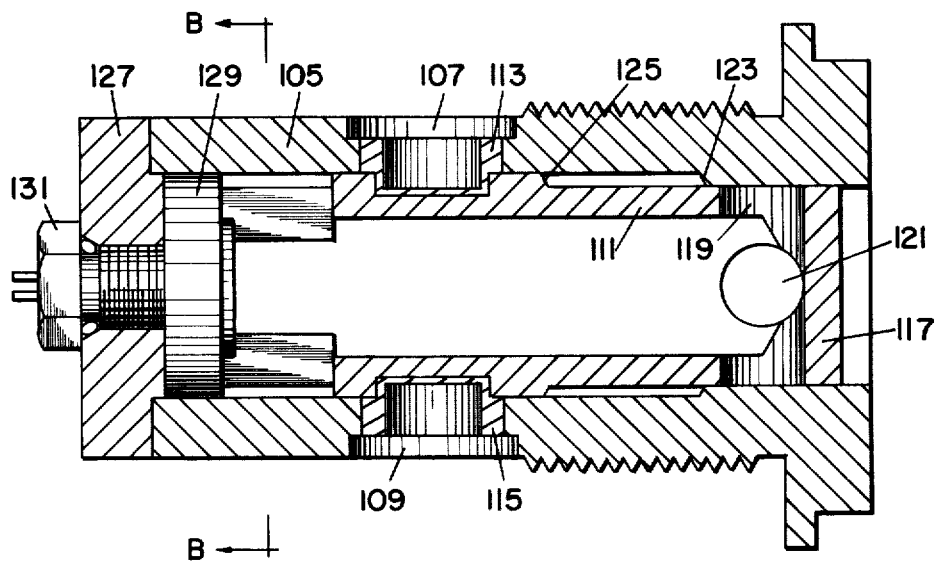
FIG. 7 is a longitudinal sectional view partly in section of another form of a valve wherein the thrust neutralizer is part of the sleeve.

Referring to FIGS. 1 and 2, valve body or shell 11 is in the form of a hollow cylinder closed at one end by head 13 sealed therein. Shell 11 is threaded on its external surface as shown at 15 so that it may be screwed into the mouth of a compressed gas container (not shown). Shell 11 contains ports 17, 19, 21, and 23. Inside shell 11 is piston 25 which is provided with a sealing O-ring 29. Also within body portion 11 is sleeve 31 which is provided with sealing O-rings 33 and 35 and which covers ports 17, 19, 21, and 23. Sleeve 31 includes leg elements 37, 39, 41, and 43 which rest against piston 25 and are positioned so that, on movement to the right, the sleeve is moved so as to uncover ports 17, 19, 21, and 23, and legs 37, 39, 41, and 43 do not obstruct those ports.

Head 13 contains squib 45 screwed therein and in communication with the top surface of piston 25. Leg wires 47 and 49 extend from squib 45 and provide for its activation.

The end of shell 11 opposite head 13 has ring 51 fastened in it. Ring 51 is formed with angled anvil surface 53 which slightly clears bevel 55 in shell 11. The leading edge of sleeve 25 is provided with a skirt 57 which is of a thickness sufficient to fit in the clearance between anvil 53 and taper 55.

In operation of the device, squib 45 is fired by the application of an electric current to lead wires 47 and 49. Firing of the squib, which is of conventional type containing a deflagrating explosive, results in pressure being exerted upon piston 25 which pushes sleeve 31 to the right, driving skirt 57 against anvil 53 and into the space between anvil 53 and taper 55, thus flaring skirt 57 so that it locks sleeve 31 in place.

FIG. 3 is a representation of the valve of FIG. 1 after functioning. It will be noted from FIG. 3 that, with sleeve 31 driven to the greatest extent of its travel, gas is free to pass from outside the device through ports 17, 19, 21, and 23 between legs 37, 39, 41, and 43 and out through ring 51.

With piston 25 being separable from sleeve 31, if the gas pressure on the right surface of piston 25 after functioning of the device is sufficient to force piston 25 backwards, the position of sleeve 31 will be unaffected. In the event the gas pressure passing through the valve becomes sufficient to force the piston backward prior to the time sleeve 31 is driven to the open position, the kinetic energy of the sleeve will be found to be sufficient to carry it to the end of its travel and to flare skirt 57 so as to prevent return of the sleeve.

Particular advantages of the valve just described are that it produces no debris upon functioning and that it produces no outward effects if fired accidentally. Thus, the valve does not contaminate parts with which it may be associated and provides safety during assembly into devices in which it is to be used.

FIG. 4 shows a modified form of sleeve and piston assembly which can be used in the valves shown in FIGS. 1, 2 and 3. Corresponding parts of FIG. 4 are designated by prime numbers. Piston 25' in FIG. 4 differs from that shown in FIG. 1 by an indentation 59 and a skirt portion 61 adjacent the sides of body portion 11. Skirt 61 is sufficiently thin that gas pressure behind the piston tends to force skirt 61 against the shell wall, thereby providing a seal. The modification shown in FIG. 4 also differs in that sleeve 31' is made somewhat smaller than the bore of shell 11 and the bearing contact with the walls of shell 11 is made by channels 63 and 64. These channels are filled with soft solder (65 on FIG. 6) prior to assembly of the valve, and after assembly, the valve is heated so as to melt the solder and cause a soldered joint to form between the wall of shell 11 and channels 63 and 64. The soldered joint is sufficiently strong to insure that sleeve 31' stays in place prior to firing but is readily broken by the force of the explosion of the squib so as to permit motion of sleeve 31' and opening of valve.

Figure 9:
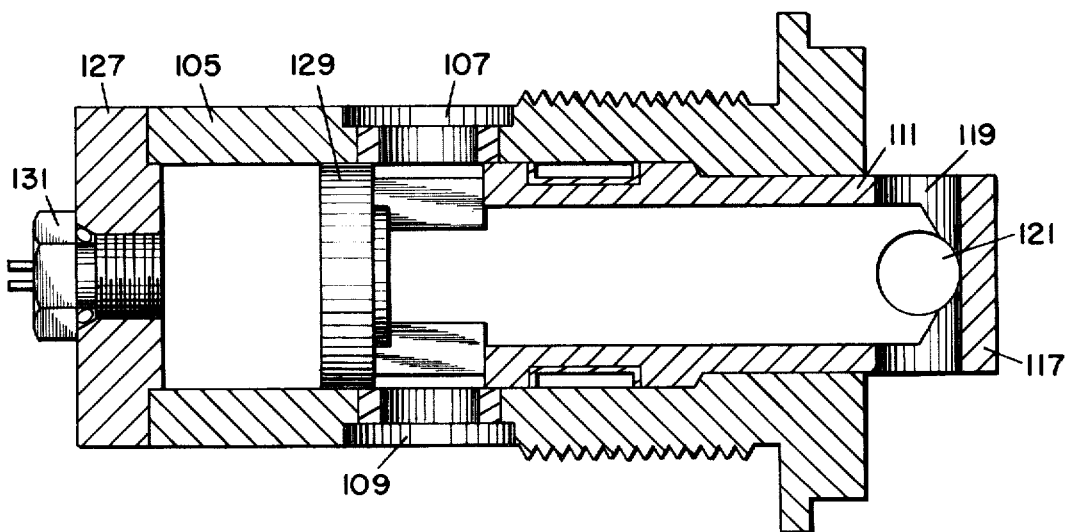
FIG. 9 is a longitudinal sectional view of the valve of FIG. 7 in opened or activated position.
Figure 8:
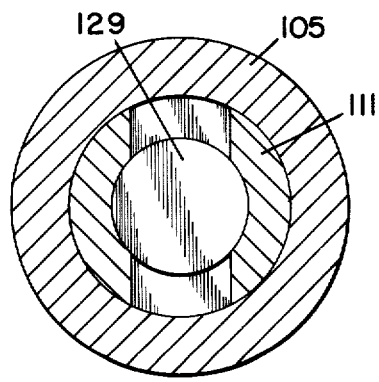
FIG. 8 is a cross-sectional view taken on line B—B in FIG. 7.

Another modification of the valve of the invention is shown in FIGS. 7, 8 and 9. Therein shell 105 contains ports 107 and 109. In closed position, as shown in FIG. 9, ports 107 and 109 are covered by sleeve 111. Each of ports 107 and 109 contains one of cups 113 and 115 respectively which extend into recesses in sleeve 111. Sleeve 111 is closed at the right end by closure portion 117. Also at the right end, sleeve 111 contains two crosswise bores 119 and 121. The right portions of both shell 105 and sleeve 111 are reduced providing shoulders 123 and 125. Sleeve 111 is split at its left end as shown on FIG. 8 so as to provide openings which on motion of sleeve 111 to the right will uncover ports 107 and 109. The valve of FIGS. 7, 8, and 9 is similar to that of FIG. 1 in its head portion 127, its piston 129 and its squib 131 located in head portion 127. In operation of the device, upon firing of squib 123, piston 129 moves to the right pushing sleeve 111 ahead of it. As sleeve 111 moves, it shears cups 113 and 115 and moves so as to uncover ports 107 and 109 permitting gas to pass through those ports down through sleeve 111 and out bores 119 and 121 which have protruded out of shell 105.

A particular value of the crosswise bores 119 and 121 is that they turn the direction of the compressed gas coming through ports 107 and 109 so as to avoid any net reactive forces on the valve body. This also has the definite advantage of not producing debris after functioning, thus protecting other elements with which it is used.

Further modifications of the valve of the invention including thrust arrestor, heater mountings, and various safety features for incorporating the total valve assembly within the mouth of a pressurized fluid container are shown in FIGS. 10 through 19 wherein corresponding parts are labeled with identical reference numbers or by corresponding ten units.

Figure 10:
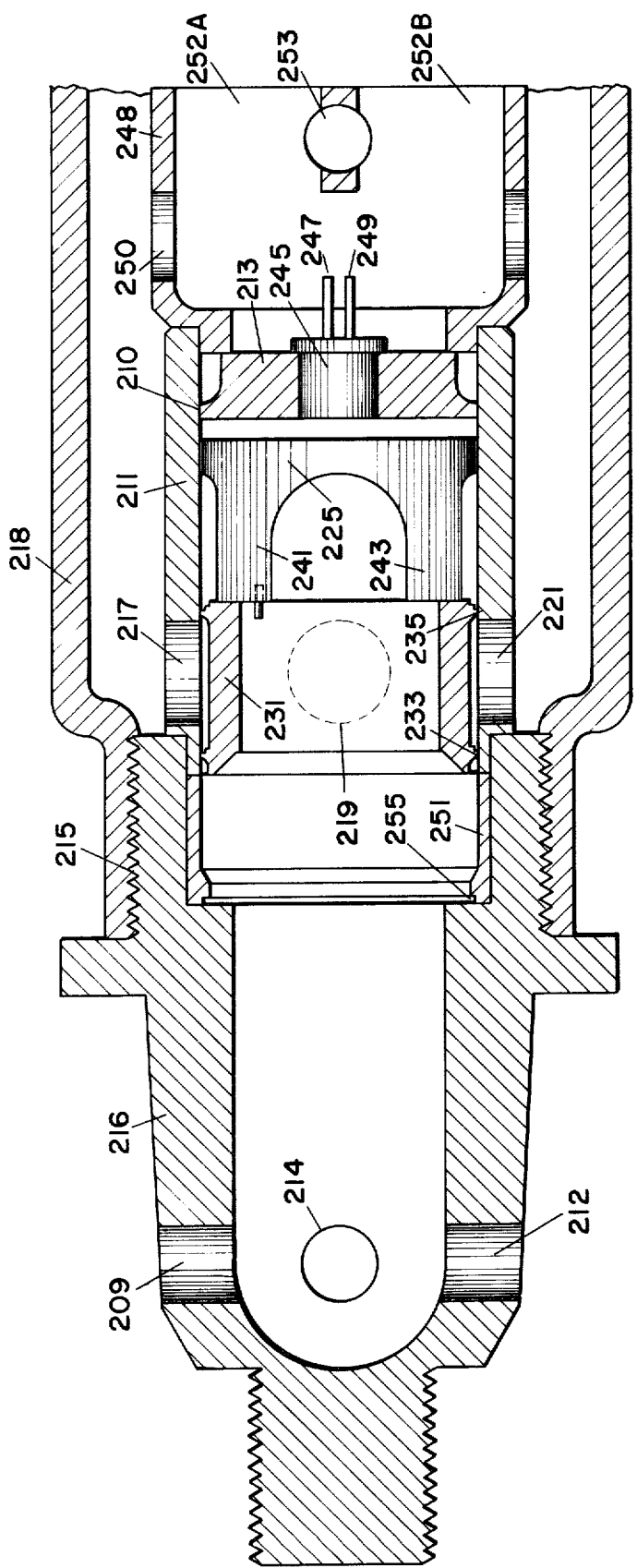
FIG. 10 is a longitudinal sectional view of thrust neutralizer, valve and heater assembly within a pressurized fluid container.
Figure 16:
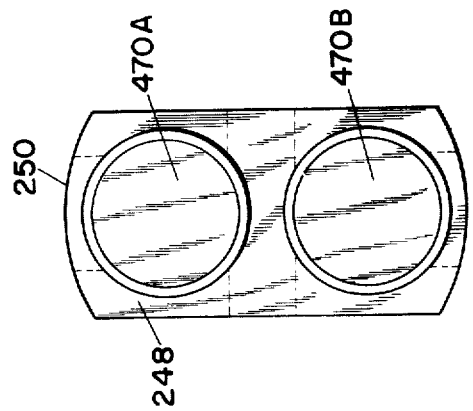
FIG. 16 is an end view look of FIG. 15 looking through section F—F.
Figure 19:
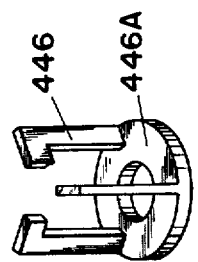
FIG. 19 is a three-dimensional, rotated view of the squib holder shown in FIG. 15.
Figure 15:
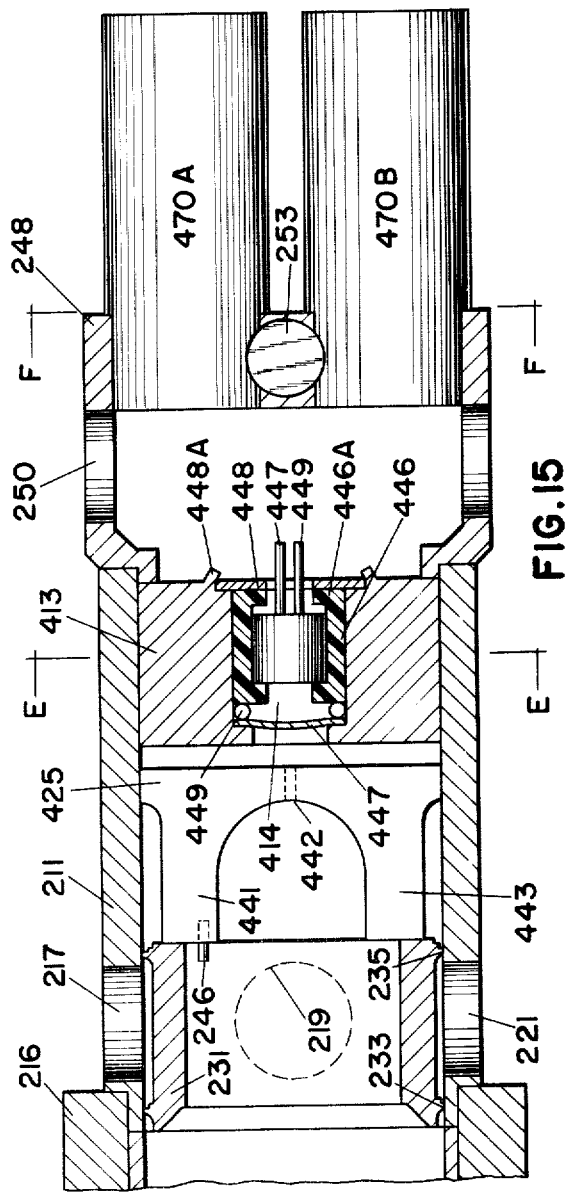
FIG. 15 is a longitudinal sectional view of another modification of the squib and heater arrangement.
Figure 18:
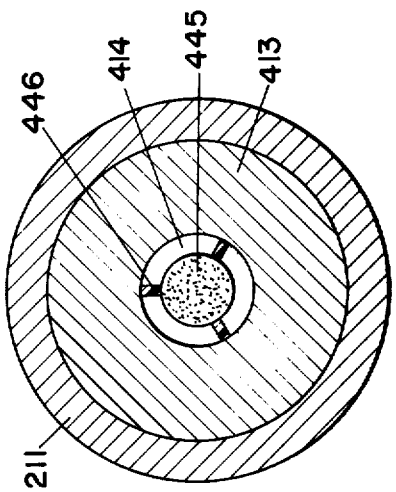
FIG. 18 is a cross-sectional view of FIG. 15 taken along section E—E.
Figure 17:
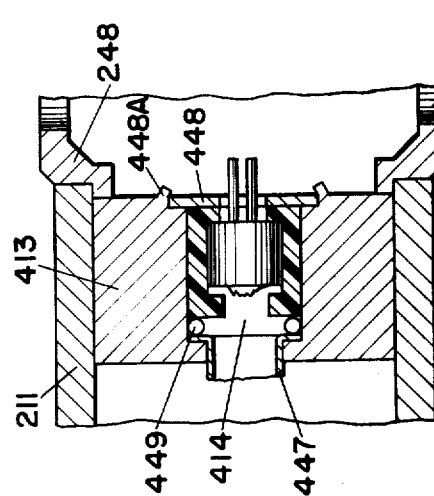
FIG. 17 is a partial section of the squib end closure arrangement of FIG. 15 after firing.

In FIG. 10 is shown the sleeve valve arrangement in combination with a thrust distributor 216 having theaded sections 215 to form a screw-in cap seal for a pressure container 218 (not completely shown), a closed end section having 4 outlet ports 212, 209, and 214 (one not shown) and an insert ring 251 beveled at 255 to form a swage device. The valve shell 211 having four outlet ports 217, 219, and 211 (fourth not shown) is permanently sealed to the cap adjacent the insert ring 251. Sleeve 231 having frangible, circumferential sleeve ring seals 233 and 235 are brazed, welded, soldered, or glued to the interior wall of the valve shell 211 to form a hermetic seal. Piston 225 is slidably mounted within the valve shell such that legs 237, 239, 241, and 243 abut the sleeve. Head 213 containing squib 245 is temporarily mounted within the valve shell and is held in place by heater mount 248 which is permanently fixed to the valve shell 211. The gas heater mount 248 has passageway 250 and heater mounting cavities 252A and 252B wherein heaters similar to those 470 shown in FIG. 15 are inserted and locked in place by pin 253.

In operation, electric current is supplied to squib 245 through lead wires 247 and 249 which are connected in series with lead wires from heaters such as pyrotechnic gas generating devices (not shown) mounted in heater cavities 252A and 252B. The explosive force from the squib is sufficient to drive piston 225 against the sleeve 231 such that frangible sleeve ring seals 233 and 235 break loose from the valve shell. As the sleeve is driven towards the cap ring insert 251 against anvil section 255, a swage lock is formed by driving the leading edge of the sleeve 257 into the cavity 255. The valve being then opened, pressurized fluid passes from the container through ports 217, 219, 221, and a fourth (not shown) into the cavity of the cap and to the gas bag (not shown) through outlet ports 212, 209, 214, and another (not shown). The outlet ports of the thrust arrestor cap are arranged such that pressurized fluid passing through the valve and exiting from the cap is directed at right angles to the direction of flow into the cap, and wherein the net resultant directional thrust forces imparted to the container are neutralized.

Advantages offered by the arrangement are particularly derived by fail-safe features such as the slidable head piece 213 sealed to the shell wall by frangible braze 210 which acts as a piston in cases where the gas generators fire and the squib fails. Pressure build-up within the fluid container is relieved by breaking the frangible shell seal 210 and by driving the head 213 against the piston to move the sleeve and permit pressure relief within the container before it can burst.

Another embodiment is shown in FIGS. 11, 12, 13, and 14. The thrust arrestor cap 216 having outlet ports 212, 209, 214, and a fourth (not shown) having a machined anvil and well 255 is welded to valve shell 311 having outlet ports 317, 319, and 321. Sleeve 331 is hermetically sealed to the shell wall along sleeve ring seals 333 and 335. Piston 325 is sealed against the shell wall by rubber O-ring 329 and abuts the sleeve through legs 337, 339, 341, and 343. The piston is locked into non-rotating alignment with the sleeve by lock pin 346 mounted in leg 341 of the piston and extending into a recess in sleeve 331. Bleed hole 342 through the piston wall permits pressure equalization. Head piece 313 containing squib 345 is permanently sealed to heater mount 348 which is permanently sealed to valve shell 311. O-ring 340 abuts the piston 325 and acts as a spacer.

In operation, electric current is supplied to lead wires 347 and 349 which are in series with auxiliary heaters (not shown). If the squib fires, a piston is driven with sufficient force to break the frangible ring seals 333 and 335, opening the fluid ports 317, 319, 321, and a fourth (not shown), driving the sleeve into anvil section 255 of the thrust neutralizer cap 216, permitting pressurized fluid to pass through the valve through the pressure cap ports 212, 209, 214, and a fourth (not shown). If internal gas heaters should fire and the squib should fail, sufficient pressure build-up inside the pressurized vessel (not shown) acts on head piece 313 through passageway 350 in the heater mount to overcome the seal 310 and head piece friction seal to drive the piston into the open position.

Premature opening of the valve is prevented in this arrangement by the presence of weep hole 342 in the piston. Slow leakage of gas through the head seal arrangement 313 at the junction of the seal 310 sometimes builds up enough pressure between the piston 325 and head piece 313 to cause opening forces. By equalizing the pressure on both sides of the piston, the net driving forces are nullified.

In another head seal arrangement of the assembly shown in FIGS. 15 through 19, thrust neutralizer cap 216 (not completely shown) is permanently sealed to valve shell 211 having exit ports 217, 219, 221, and a fourth (not shown). Sleeve 231 is sealed to valve shell 211 by frangible sleeve ring seals 233 and 235 which are brazed to the shell wall to form a hermetic seal. Piston 425 is abutted to the valve sleeve through legs 441, 443, and others not shown and it is locked into non-rotating alignment with the valve sleeve through pin 246 similar to that shown in FIG. 14. Head piece 413 containing a rupture disc 447 and squib cavity 414 is permanently sealed to the valve shell 211. Squib 445 is slidably mounted within cavity 414 in a plastic squib holder 446 mounted to plastic ring 446A. The squib and squib holder are held within the cavity in sliding relationship by washer 448 which is held in place by crimp ring 448A. Heater mount 248 is permanently fixed to the valve shell 211 and contains access port 250. Heater cavities 251A and 251B contain the pyrotechnic gas generators 470A and 470B which are locked in place by pin 253.

In operation, the thrust neutralizer-valve-heater assembly which is adapted for insertion within a pressurized fluid container (not shown) through its outlet port is activated by supplying electric current through lead wires 447 and 449 which are connected in series with lead wires (not shown) from pyrotechnic gas heaters 470A and 470B. The explosive forces generated from the squib break the rupture disc 447 held in place by ring seal 444 and permit movement of the piston to open the valve sleeve. In case the squib does not fire and the pyrotechnic gas heater generators are ignited, the head design permits pressurized gas from within the container to by-pass the squib through ring 446A and holder 446 and break the rupture disc 447 which is selected in size and strength to be broken at pressures substantially below that required to rupture the pressure vessel containing the fluid. Premature opening is sometimes caused by gas leakage around the rupture disc seals and others in cases where no weep hole 442 is provided to permit equalization of pressure on both sides of the piston 425. Further improvments offered by the head design permit fluid gases to flow through passageways directly into the piston chamber, therefore, insuring that the valve does not prematurely close.

What is claimed is:

1. In a sleeve valve for containing fluid under pressure comprising a shell having a plurality of ports therein, a closure across said shell, a hollow sleeve slidable in said shell into separate positions in which said ports are covered and uncovered, a piston in said shell separable from said sleeve and positioned between said sleeve and said closure, and means for exerting pressure between said closure and said piston so as to slide said sleeve, wherein said sleeve opposite said piston is provided with a thin leading edge, said shell is provided with means for flaring said leading edge upon being moved by said piston to lock said sleeve in the open position and which when said ports are uncovered permits fluid to flow through said ports and out through said sleeve.

2. A sleeve in accordance with claim 1 in which said means for exerting pressure is an explosive squib positioned in said closure.

3. A sleeve valve in accordance with claim 2 in which the trailing end of said piston is provided with a thin flange in contact with the walls of said shell.

4. A valve assembly of claim 1 adapted for mounting within the mouth of a container used for holding fluid under pressure wherein:
 a. a thrust arrestor cap is attached to the port end of said shell, said thrust arrestor having outlet ports arranged such that pressurized fluid passing through said valve and exiting from said cap is directed at right angles to the direction of flow into said cap and wherein the net resultant directional thrust forces imparted to the container are neutralized;
 b. said slidable sleeve is hermetically sealed to said shell by frangible sleeve ring seals on each side of said ports in said shell;
 c. said piston within said shell is locked into non-rotating alignment with said sleeve;
 d. said closure across said shell has means to permit fluid within said pressure container to pass into said shell between said piston and said closure when means for asserting pressure between said closure and said piston fails to slide said sleeve; and
 e. a heater mount is attached to the closure end of said shell having means to hold an electrically activated pyrotechnic gas generator, said heater mount provided with passageways to permit hot gases from said pyrotechnic gas generator to pass into said container.

5. An assembly of claim 4 wherein said piston has conduit means to equalize the pressure on both sides of said piston.

6. An assembly of claim 4 wherein the means to permit fluid within said pressure container to pass into said shell between said piston and said closure is a rupture disc which breaks at a pressure lower than said container holding said fluid under pressure.

7. An assembly of claim 6 wherein said rupture disc is mounted in a well in said closure end located between said piston and means for asserting pressure between said closure and said piston.

8. An assembly of claim 4 wherein said closure end is sealed to said shell by frangible means.

* * * * *